(12) United States Patent
Douma

(10) Patent No.: US 8,372,462 B2
(45) Date of Patent: Feb. 12, 2013

(54) DEVICE AND METHOD FOR FROTHING A LIQUID

(75) Inventor: Sipke Theo Douma, Haren (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 60 days.

(21) Appl. No.: 13/059,109

(22) PCT Filed: Aug. 13, 2009

(86) PCT No.: PCT/IB2009/053580
§ 371 (c)(1),
(2), (4) Date: Feb. 15, 2011

(87) PCT Pub. No.: WO2010/020918
PCT Pub. Date: Feb. 25, 2010

(65) Prior Publication Data
US 2011/0143006 A1    Jun. 16, 2011

(30) Foreign Application Priority Data

Aug. 19, 2008   (EP) .................................. 08162571

(51) Int. Cl.
*A47J 31/44* (2006.01)
*A23P 1/16* (2006.01)
(52) U.S. Cl. .......... 426/474; 426/594; 99/293; 134/22.1
(58) Field of Classification Search .................. 426/474, 426/594
See application file for complete search history.

(56) References Cited

U.S. PATENT DOCUMENTS

| | | | | |
|---|---|---|---|---|
| 3,632,021 A * | 1/1972 | MacManus | ...................... | 222/95 |
| 5,498,757 A * | 3/1996 | Johnson et al. | ................ | 426/520 |
| 6,019,032 A * | 2/2000 | Arksey | ............................ | 99/452 |
| 6,099,878 A | 8/2000 | Arksey | | |
| 6,192,785 B1 | 2/2001 | Trida et al. | | |
| 6,959,642 B1 * | 11/2005 | Landolt | .......................... | 99/455 |
| 2005/0172833 A1 * | 8/2005 | Ioannone et al. | ............... | 99/453 |
| 2005/0233043 A1 | 10/2005 | Dirren | | |
| 2007/0272317 A1 | 11/2007 | Klopfenstein et al. | | |
| 2008/0216665 A1 * | 9/2008 | Hoehne et al. | ................... | 99/293 |

FOREIGN PATENT DOCUMENTS

| | | |
|---|---|---|
| EP | 0485350 A1 | 5/1992 |
| EP | 1256299 A2 | 11/2002 |
| WO | 2006034810 A1 | 4/2006 |

* cited by examiner

Primary Examiner — Anthony Weier

(57) ABSTRACT

A device for producing froth includes means (1) which are adapted to perform a pumping function and to perform a mixing process of at least one liquid and a gas at the same time. Furthermore, the device includes suitable means (2) for supplying the liquid and the gas to the pumping means (1), and suitable means (3) for discharging froth from the pumping means (1). In order for the device to be capable of producing hot froth, means (4) for supplying steam are provided, and arranged such as to supply the steam directly to the pumping means (1), in particular to an outlet side of the pumping means (1). This way of attributing a heating functionality to the pumping means (1) has many advantages, including the option of a most compact design. Furthermore, the steam may be used for cleaning the pumping means (1).

9 Claims, 2 Drawing Sheets

DEVICE AND METHOD FOR FROTHING A LIQUID

FIELD OF THE INVENTION

The present invention relates to a device for frothing a liquid such as milk, comprising:
- means which are adapted to perform a pumping function, particularly to displace a fluid from a fluid inlet side to a fluid outlet side while increasing a pressure in the fluid;
- means for supplying the liquid to the pumping means, at the fluid inlet side of the pumping means; and
- means for supplying a gas such as air to the pumping means, at the fluid inlet side of the pumping means.

Furthermore, the present invention relates to a beverage maker such as a coffee appliance or an espresso appliance, comprising a frothing device as mentioned, and to a method for frothing and heating a liquid such as milk, wherein means which are adapted to perform a pumping function, particularly to displace a fluid from a fluid inlet side to a fluid outlet side while increasing a pressure in the fluid, are provided for mixing the liquid and a gas and thereby frothing the liquid, and wherein the liquid and the gas are supplied to the pumping means, at the fluid inlet side of the pumping means.

BACKGROUND OF THE INVENTION

A device and a method for frothing a liquid such as milk having the particulars as mentioned in the foregoing are known. For example, US 2005/0233043 discloses a device and a method for producing milk foam, wherein a pump is used for suctioning milk from a container and conveying the milk to an outlet of the device. The milk is routed through a continuous-flow heater during suctioning and heated. Furthermore, air can be added to the milk for frothing the milk.

On the basis of the application a continuous-flow heater in the known device, it is possible to use one and the same device for producing cold or hot milk foam. In particular, the continuous-flow heater is only put to an activated condition when hot milk foam needs to be produced, whereas the continuous-flow heater is kept in a deactivated condition when cold milk foam needs to be produced.

A disadvantage of applying a heater which is adapted to transfer heat to milk froth on the basis of conduction, like a continuous-flow heater, is the necessity for cleaning a surface of the heater which serves for contacting the milk froth. The same disadvantage is encountered when applying a mechanical pump for producing milk froth, as it is necessary to clean the inside of the pump after use.

SUMMARY OF THE INVENTION

It is an object of the present invention to provide a device for frothing a liquid such as milk, which may comprise a mechanical pump, which is capable of switching between a process of heating the frothed liquid and a process of leaving the frothed liquid in a cold state, and which has an improved cleanability. This object is achieved by a device comprising pumping means, liquid supplying means and gas supplying means as mentioned in the foregoing, and further comprising means for supplying steam to the pumping means, at the fluid outlet side of the pumping means.

According to the present invention, steam is fed directly into the pumping means, i.e. the means where a liquid and a gas for frothing the liquid are mixed and where, consequently, a frothing process takes place. This way of doing has a number of important advantages. In the first place, it is not necessary to have an additional heating chamber or the like. In general, as steam is used for heating, the frothing device may come without additional heat conduction surfaces, so that the possibility of heating a frothed liquid is realized without increasing an area to be cleaned. In the second place, the steam may very well be used to steam-clean the inside of the pumping means. In the third place, only using steam for the purpose of heating allows for switching between hot and cold without big rest warmth effects. In the fourth place, the frothing device can be compact and simple on the basis of the fact that all functions of pumping, frothing and heating are combined.

Within the scope of the present invention, the pumping means may comprise any suitable type of mechanical pump, i.e. any pump which is capable of mixing a liquid and a gas for the purpose of producing froth, and of realizing a displacement of the various fluids from a fluid inlet side to a fluid outlet side. For example, the pumping means may comprise a gear pump having two meshing gears. In that case, it is preferred if the steam supplying means are adapted to supply steam right behind a meshing area of the gears as seen in a direction from the fluid inlet side to the fluid outlet side of the gear pump, as in that way, it is possible to realize an optimal heating process of frothed liquid without affecting the pumping and frothing functions of the gear pump. In particular, it is advantageous if the steam supplying means are adapted to supply steam to the gear pump in a flow that is oriented substantially parallel to axes of rotation of the gears of the gear pump. In that case, the steam is directed such as to mainly flow alongside the gears, and the most of its heating capacity may actually be used for heating the produced froth.

The present invention also relates to a method for frothing and heating a liquid, wherein pumping means are provided for mixing the liquid and a gas and thereby frothing the liquid, wherein the liquid and the gas are supplied to the pumping means, at the fluid inlet side of the pumping means, and wherein steam is supplied to the pumping means as well, at the fluid outlet side of the pumping means. The advantages of using steam for heating and feeding the steam directly to the pumping means, at a fluid outlet side of the pumping means, are the same as those already mentioned in respect of the frothing device according to the present invention.

For the reasons as mentioned in the foregoing, it is advantageous and practical when the pumping means comprise a gear pump having two meshing gears, and to supply the steam right behind a meshing area of the gears as seen in a direction from the fluid inlet side to the fluid outlet side of the gear pump, wherein it is a preferred option to supply the steam in a flow that is oriented substantially parallel to axes of rotation of the gears of the gear pump.

The present invention further relates to a method for cleaning the pumping means of the frothing device, wherein steam is supplied to the pumping means by the steam supplying means of the device. Steam-cleaning yields good results, and the fact that the steam supplying means are suitable to be used for performing two different functions, namely performing a heating process of the frothed liquid or performing a cleaning process of the pumping means, contributes to a compact design of the frothing device.

The above-described and other aspects of the present invention will be apparent from and elucidated with reference to the following description of an embodiment of the frothing device according to the present invention, which comprises a gear pump.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

The figures show a gear pump 1 which is part of a frothing device according the present invention, and portions of various tubes 2, 3, 4 which are connected to the gear pump 1 for supplying a fluid to the gear pump 1 or discharging a fluid from the gear pump 1. The frothing device according to the present invention is not shown as a whole, and it is noted that in general, the frothing device is adapted to produce froth by mixing a liquid and a gas. In the following description, it will be assumed that the liquid is milk and that the gas is air, which does not alter the fact that other fluids may be chosen within the scope of the present invention.

It will be understood that the frothing device has inlets for letting in the milk and the air, and an outlet for letting out milk froth. The frothing device may further comprise a suitable container for containing a quantity of the milk. The gear pump 1 serves for drawing the milk and the air to its inside, mixing these two ingredients, and displacing the milk froth which is obtained in this way towards the outlet of the device. The way in which this is done will now be explained on the basis of FIG. 1.

Figure 1:
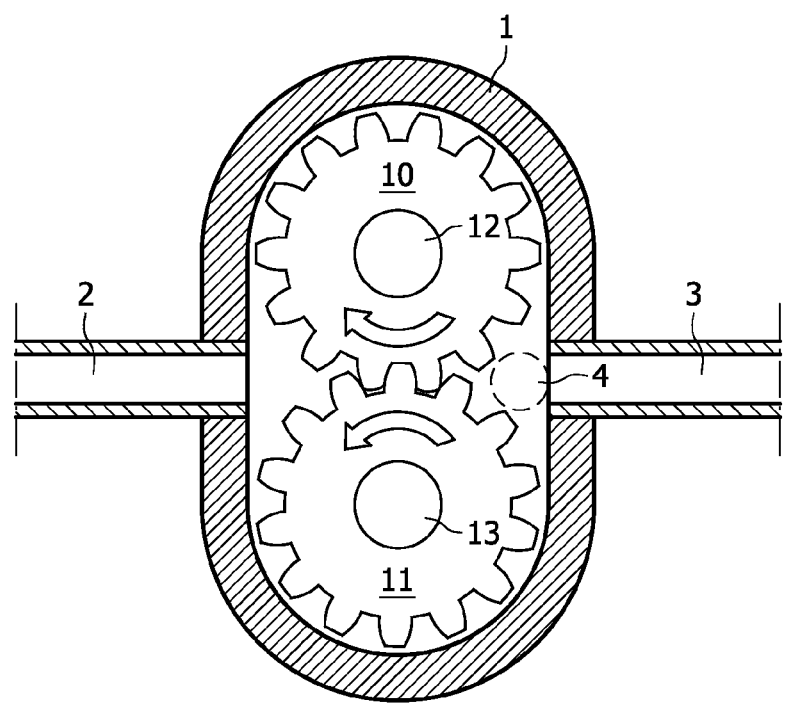
FIG. 1 diagrammatically shows a sectional view of a number of components of a frothing device according to the present invention, in particular a gear pump, wherein furthermore a portion of an inlet tube connected to the gear pump at a fluid inlet side of the gear pump, and a portion of an outlet tube connected to the gear pump at a fluid outlet side of the gear pump can be seen.
Figure 3:
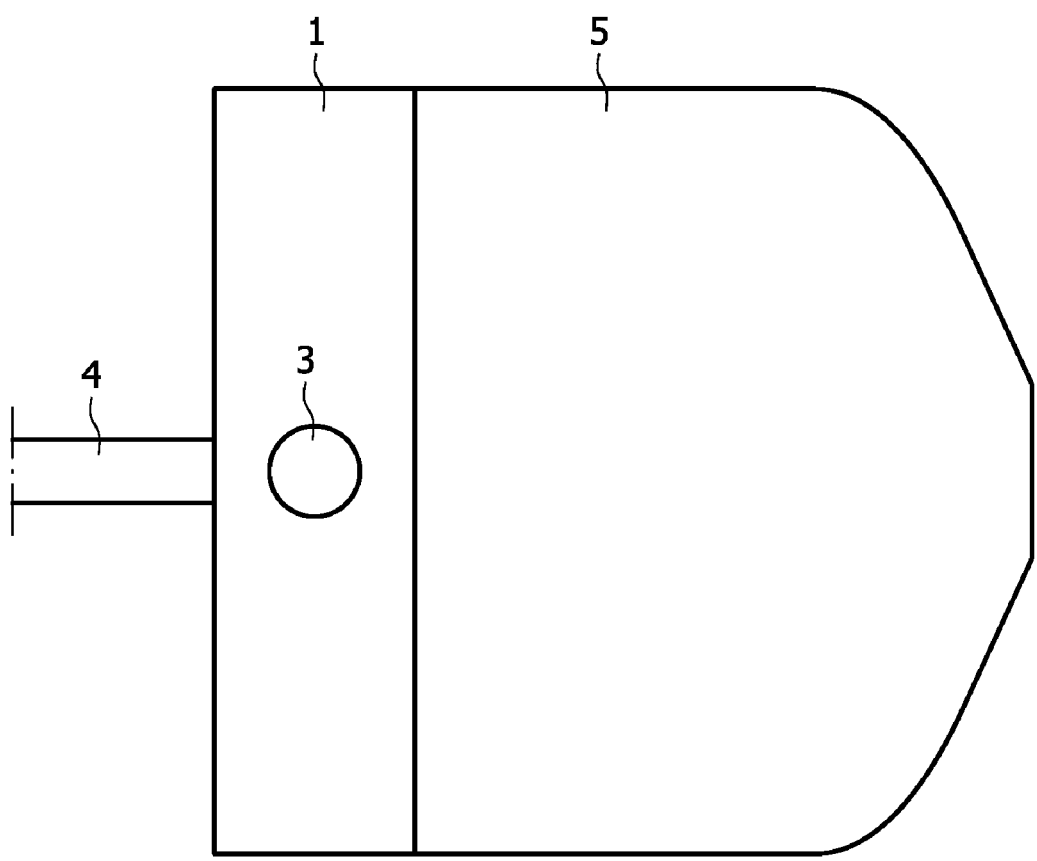
FIG. 3 diagrammatically shows another non-sectional view of the gear pump, wherein furthermore a portion of the outlet tube connected to the gear pump at the fluid outlet side of the gear pump, and a portion of the inlet tube connected to the gear pump at the fluid outlet side of the gear pump can be seen.

FIG. 1 shows a sectional view of the gear pump 1, so that the inside of the gear pump 1 is visible in this figure. The gear pump 1 is a conventional gear pump, and comprises two meshing gears 10, 11 and a motor for driving a shaft 12, 13 of one of these gears 10, 11. The motor is not shown in the figures, but a housing 5 for accommodating the motor can be seen in FIG. 3. Directions in which the gears 10, 11 are rotating during operation of the motor are diagrammatically depicted by means of arrows in FIG. 1.

In the shown example, milk and air are supplied to the gear pump 1 through a single inlet tube 2, which is connected to the gear pump 1 at a side which is referred to as fluid inlet side. The inlet tube 2 is arranged such as to supply the milk and the air at a position where the gears 10, 11 of the gear pump 1 are meshing, wherein a flow of the milk and the air is initially oriented perpendicular to the rotation axes of the gears 10, 11. Inside the gear pump 1, the milk and the air are forced to flow along with the gears 10, 11 at the toothed periphery of the gears 10, 11. In the process, the milk and the air are mixed so that milk froth is produced. At a certain point, the milk froth arrives at another side of the gear pump 1, which is referred to as fluid outlet side. At this side, an outlet tube 3 is connected to the gear pump 1, and the milk froth is discharged from the gear pump 1 through this outlet tube 3, and transported further towards the outlet of the frothing device, where a receptacle for receiving the milk froth may be positioned.

None of the milk, the air and the milk froth is capable of passing between the gears 10, 11, i.e. the area where the gears 10, 11 are meshing. Therefore, the only way of these fluids through the gear pump 1 is along the periphery of the gears 10, 11, wherein there is no way back due to the ongoing rotation of the gears 10, 11 and the blocked passage between the gears 10, 11. In the process, the pressure is increased, wherein the pressure at the fluid outlet side of the gear pump 1 is higher than de pressure inlet side.

Figure 2:
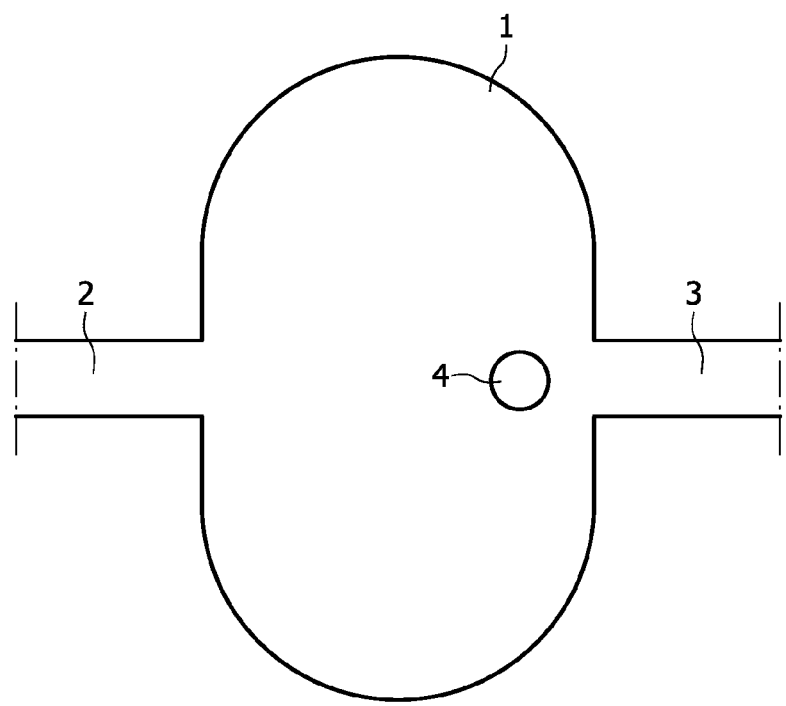
FIG. 2 diagrammatically shows a first non-sectional view of the gear pump, wherein furthermore a portion of the inlet tube connected to the gear pump at the fluid inlet side of the gear pump, a portion of the outlet tube connected to the gear pump at the fluid outlet side of the gear pump, and a portion of an inlet tube connected to the gear pump at the fluid outlet side of the gear pump can be seen.

The frothing device is capable of producing cold milk froth or hot milk froth, depending on a choice of a user of the device. To this end, according to the present invention, an inlet tube 4 for supplying steam to the gear pump 1 is connected to the gear pump 1, at the fluid outlet side of the gear pump 1. This steam inlet tube 4 can be seen in FIGS. 2 and 3, and in FIG. 1, the position of this inlet tube 4 is indicated by means of a dashed line. It is clear from FIG. 1 that the steam inlet tube 4 is arranged such as to supply steam at a position right behind the meshing area of the gears as seen in the direction from the fluid inlet side to the fluid outlet side. At this position, the steam can perform its heating function without impeding the pumping function of the gear pump 1 or the mixing process of the milk and the air. In particular, the steam inlet tube 4 is arranged such as to supply the steam in a flow in a direction substantially parallel to the rotation axes of the gears 10, 11, so that the steam is not directly aimed at the gears 10, 11, and the most of its heating capacity may be used to actually heat the milk froth.

It is clear from the foregoing that in the frothing device according to the present invention, steam is used for heating the milk froth if so desired. In general, the present invention may be denoted as feeding steam directly into a mechanical frothing component of a frothing device. An important advantage of this fact is that the frothing device does not need to comprise separate means for realizing the possibility of heating, other than means for supplying steam to the gear pump 1. It is an achievement of the present invention to combine the functions of pumping, mixing and heating in a single component of the frothing device. Moreover, the steam may be used for the purpose of cleaning the inside of the gear pump 1, so that it is not necessary to take additional measures for realizing a cleaning function. Hence, the device according to the present invention is of a relatively simple and extremely compact design.

The frothing device according to the present invention may be used as a stand-alone device, but may also be arranged as a unit in a larger system. For example, the frothing device may be incorporated in a beverage maker such as a coffee appliance or an espresso appliance, which has to supply milk recipes.

The steam which is supplied to the gear pump 1 may be produced in any suitable manner known per se. To this end, the frothing device may be combined with a steam generator and possibly also with a water tank for containing water to be used for making the steam.

In the shown embodiment of the frothing device according to the present invention, the milk and the air are supplied to the gear pump 1 by means of a single tube 2. However, that does not alter the fact that separate tubes may be applied.

It is noted that the frothing device according to the present invention may comprise another suitable type of mechanical pump than the gear pump 1 as described in the foregoing. In any case, according to the present invention, the frothing device comprises means for supplying steam to the pump, in particular to the fluid outlet side of the pump. Means for supplying fluids to the pump and discharging fluids from the pump do not necessarily need to be tubes, but may also be embodied in another suitable way. For example, the supplying/discharging means may comprise ducts extending through a piece of material.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a device for producing froth has been described. The frothing device comprises means 1 which are adapted to perform a pumping function and to perform a mixing process of at least one liquid and a gas at the same time. Furthermore, the device comprises suitable means 2 for supplying the liquid and the gas to the pumping means 1, in particular to a side of the pumping means 1 which is denoted as fluid inlet side, and suitable means 3 for discharging froth from the pumping means 1, in particular from a side of the pumping means 1 which is denoted as fluid outlet side. In order for the device to be capable of producing hot froth, means 4 for supplying steam are provided, and arranged such as to supply the steam directly to the pumping means 1, in particular to the fluid outlet side of the pumping means 1. This way of attributing a heating functionality to the pumping means 1 has many advantages, including the option of a most compact design. Furthermore, the steam may be used for cleaning the pumping means 1.

The invention claimed is:

1. Device for frothing a liquid such as milk, comprising:
    means for performing a pumping function to actively displace a fluid from a fluid inlet side to a fluid outlet side while increasing a pressure in the fluid;
    means for supplying the liquid to the pumping means, at the fluid inlet side of the pumping means (1);
    means for supplying a gas to the pumping means, at the fluid inlet side of the pumping means; and
    means for supplying steam directly to the pumping means, at the fluid outlet side of the pumping means.

2. Device according to claim 1, wherein the pumping means comprise a gear pump having two meshing gears, and wherein the steam supplying means are adapted to supply steam right behind a meshing area of the gears as seen in a direction from the fluid inlet side to the fluid outlet side of the gear pump.

3. Device according to claim 2, wherein the steam supplying means are adapted to supply steam to the gear pump in a flow that is oriented substantially parallel to axes of rotation of the gears of the gear pump.

4. Beverage maker comprising a device according to claim 1.

5. Method for frothing and heating a liquid such as milk, the method comprising:
    performing a pumping function to actively displace a fluid from a fluid inlet side to a fluid outlet side while increasing a pressure in the fluid,
    mixing the liquid and a gas and thereby frothing the liquid, wherein the liquid and the gas are supplied to the pumping means, at the fluid inlet side of the pumping means, and
    wherein steam is supplied directly to the pumping function as well, at the fluid outlet side of the pumping function.

6. Method according to claim 5, wherein the pumping means comprise a gear pump having two meshing gears, and wherein the steam is supplied right behind a meshing area of the gears as seen in a direction from the fluid inlet side to the fluid outlet side of the gear pump.

7. Method according to claim 6, wherein the steam is supplied to the gear pump in a flow that is oriented substantially parallel to axes of rotation of the gears of the gear pump.

8. Device according to claim 1, wherein the gas is air.

9. Beverage maker according to claim 4, wherein the beverage maker is one of a coffee appliance and an espresso appliance.

* * * * *